United States Patent
Suenaga et al.

(10) Patent No.: US 12,476,449 B2
(45) Date of Patent: Nov. 18, 2025

(54) BOOT-ATTACHED CABLE AND MEDICAL DIAGNOSTIC DEVICE

(71) Applicant: Hitachi Metals, Ltd., Tokyo (JP)

(72) Inventors: Kazufumi Suenaga, Tokyo (JP); Seiichi Kashimura, Tokyo (JP); Takanobu Watanabe, Tokyo (JP)

(73) Assignee: Proterial, Ltd., Tokyo (JP)

( * ) Notice: Subject to any disclaimer, the term of this patent is extended or adjusted under 35 U.S.C. 154(b) by 416 days.

(21) Appl. No.: 18/070,190

(22) Filed: Nov. 28, 2022

(65) Prior Publication Data

US 2023/0208126 A1    Jun. 29, 2023

(30) Foreign Application Priority Data

Dec. 24, 2021    (JP) .................... 2021-211532

(51) Int. Cl.
*H02G 15/06* (2006.01)
*A61B 1/00* (2006.01)
*A61B 8/00* (2006.01)
*C09J 183/04* (2006.01)
*G21F 1/10* (2006.01)

(52) U.S. Cl.
CPC ............ *H02G 15/06* (2013.01); *C09J 183/04* (2013.01); *G21F 1/10* (2013.01); *A61B 1/00124* (2013.01); *A61B 8/4433* (2013.01)

(58) Field of Classification Search
None
See application file for complete search history.

(56) References Cited

U.S. PATENT DOCUMENTS

| | | | | |
|---|---|---|---|---|
| 2012/0328863 A1* | 12/2012 | Kuo | ................ | C09J 183/04 524/588 |
| 2013/0310781 A1* | 11/2013 | Phillips | ................ | A61F 13/05 521/134 |
| 2015/0303616 A1* | 10/2015 | Yagi | ................ | H02G 3/0462 174/659 |
| 2021/0079258 A1 | 3/2021 | Kashimura et al. | | |

FOREIGN PATENT DOCUMENTS

| | | | | |
|---|---|---|---|---|
| JP | 2018023758 A | * | 2/2018 | |
| JP | 2020-048794 A | | 4/2020 | |
| JP | 2021-126514 A | | 9/2021 | |
| WO | WO-2012137837 A1 | * | 10/2012 | ......... C08G 59/4085 |

OTHER PUBLICATIONS

English machine translation for WO-2012137837-A1 (Year: 2012).*
English machine translation for JP-2018023758-A (Year: 2018).*
"Notice of Reasons for Refusal" Office Action issued in JP 2021-211532; mailed by the Japanese Patent Office on Jun. 3, 2025.

* cited by examiner

*Primary Examiner* — Robert H Kim
*Assistant Examiner* — Alina Kaliszewski
(74) *Attorney, Agent, or Firm* — Studebaker Brackett PLLC

(57) ABSTRACT

A boot-attached cable is composed of a cable, and a cable boot secured to an end of the cable by an adhesive layer. The adhesive layer includes an additive material comprising at least one of an organic substant and an inorganic substance, capable of shielding against ultraviolet light.

9 Claims, 5 Drawing Sheets

BOOT-ATTACHED CABLE AND MEDICAL DIAGNOSTIC DEVICE

CROSS-REFERENCE TO RELATED APPLICATION

The present patent application claims the priority of Japanese patent application No. 2021-211532 filed on Dec. 24, 2021, and the entire contents thereof are hereby incorporated by reference.

TECHNICAL FIELD

The present invention relates to a boot-attached cable and a medical diagnostic device.

BACKGROUND ART

Conventionally, there is known a probe cable including a cable, a probe main body with a cable boot (cable bush) being attached to one end of the cable, in which the cable boot is bonded and fixed to the cable by an adhesive layer formed by the application of an adhesive (see Patent Literature 1). In Patent Literature 1, a silicone rubber-based adhesive is disclosed.

CITATION LIST

Patent Literature

Patent Literature 1: JP2018-23758A

SUMMARY OF THE INVENTION

In recent years, the sterilization method by ultraviolet light irradiation has been attracting attention as a simple, inexpensive, and reliable method of sterilizing cables for medical equipment. However, when sterilization by irradiation of ultraviolet light is performed on cables with boots, such as the probe cable described in Patent Literature 1, where the cable boot is fixed to the cable by an adhesive layer, if the adhesive layer between the cable boot and the cable is exposed to ultraviolet light, the adhesive layer may become less elastic or harden and crack. The cracking of the adhesive layer can then cause damage and deterioration around the adhesive area, such as the cable boot peeling off from the cable.

Therefore, it is an object of the present invention to provide a boot-attached cable in which a cable boot is fixed to a cable by an adhesive layer, the boot-attached cable capable of suppressing damage and deterioration of the adhesive portion between the cable boot and cable due to exposure to ultraviolet light, and to provide a medical diagnosis device equipped with such a boot-attached cable.

So as to solve the above problem, one aspect of the present invention provides a boot-attached cable, comprising a cable, and a cable boot fixed to an end of the cable by an adhesive layer, wherein the adhesive layer includes an additive material comprising at least one of organic substance and inorganic substance, capable of shielding against ultraviolet light.

So as to solve the above problem, another aspect of the present invention provides a medical diagnostic device comprising the boot-attached cable.

Effects of the Invention

According to the present invention, it is possible to provide the boot-attached cable in which the cable boot is fixed to the cable by the adhesive layer, the boot-attached cable which can suppress damage and deterioration of the adhesive part between the cable boot and the cable due to exposure to ultraviolet light, and to provide the medical diagnostic device equipped with the boot-attached cable.

BEST MODE FOR CARRYING OUT THE INVENTION

Figure 1:
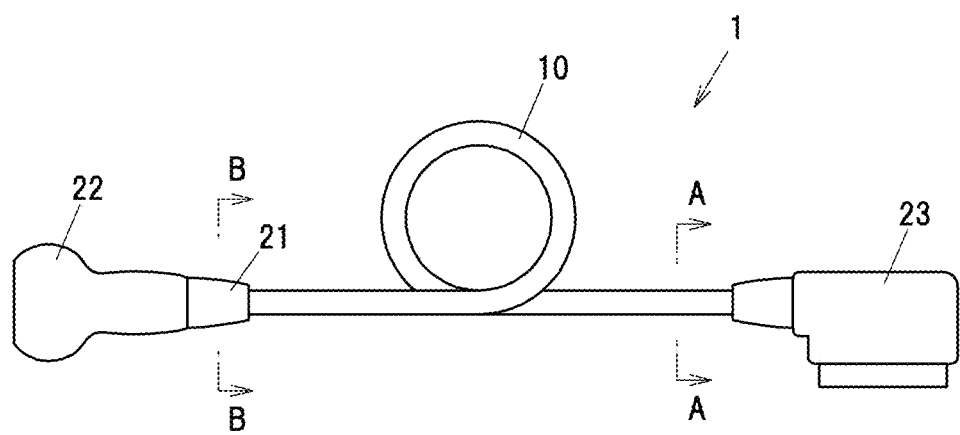
FIG. 1 is a schematic plan view showing the configuration of a medical ultrasonic probe cable, which is an example of a boot-attached cable according to the present invention.

FIG. 1 is a schematic plan view showing the configuration of a medical ultrasonic probe cable 1, which is an example of a boot-attached cable according to the present invention.

The ultrasonic probe cable 1 has a cable 10, an ultrasonic probe 22 attached to one end (i.e., first end) of the cable 10 via a cable boot 21 that protects the first end, and a connector 23 attached to the other end (i.e., second end) of the cable 10 that is connected to a main body portion of an ultrasonic imaging device.

Figure 2A:
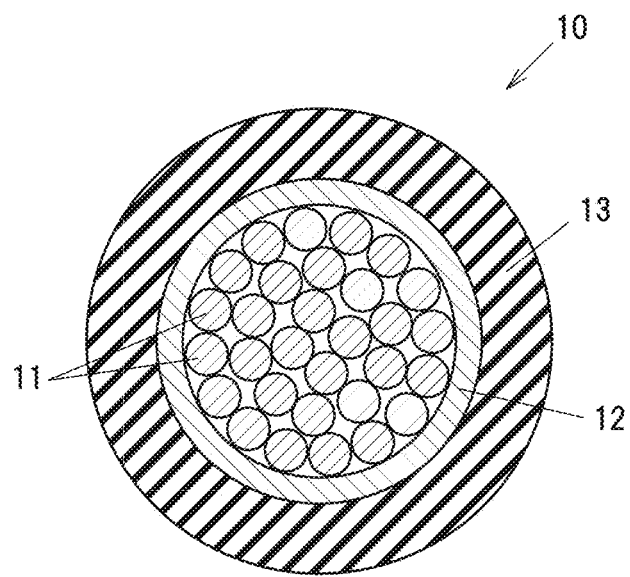
FIG. 2A is a cross-sectional view in the radial direction of the cable of the ultrasonic probe cable, cut along the cut line A-A described in FIG. 1.

FIG. 2A is a cross-sectional view in the radial direction of the cable 10 of the ultrasonic probe cable 1, cut along the cut line A-A described in FIG. 1. The cable 10 includes electric wires 11, e.g., a plurality of coaxial cables, and a shield 12, such as a braided shield, provided to cover the electric wires 11. A sheath 13 is then provided to cover the shield 12.

Figure 2B:
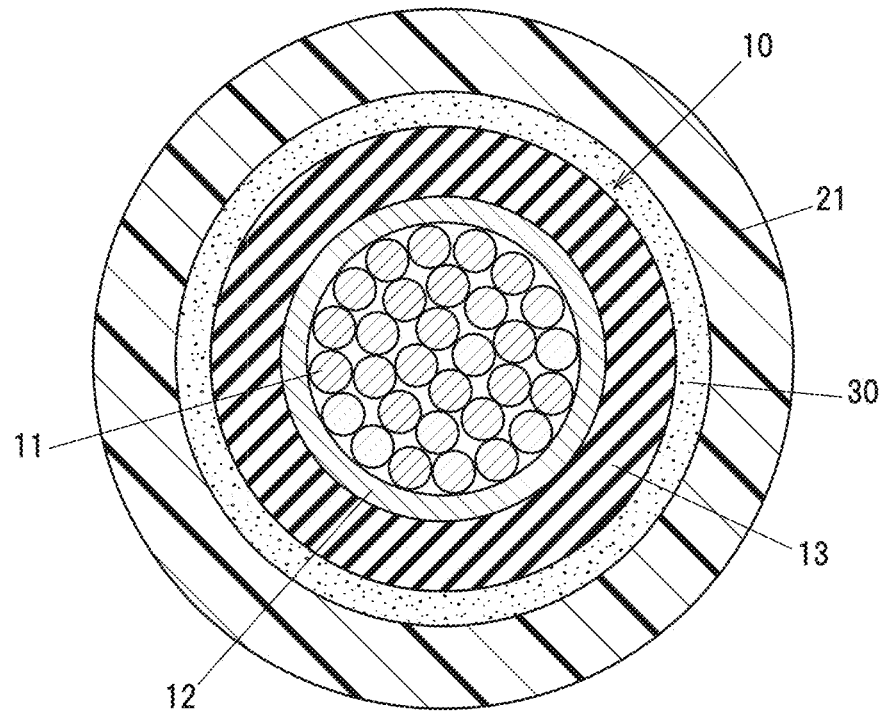
FIG. 2B is a cross-sectional view in the radial direction of the cable of the ultrasonic probe cable, cut along the cut line B-B described in FIG. 1.

FIG. 2B is a cross-sectional view in the radial direction of the cable 10 of the ultrasonic probe cable 1, cut along the cut line B-B described in FIG. 1. The cable boot 21 is mounted on the sheath 13 to cover the sheath 13 via an adhesive layer 30, as shown in FIG. 2B. The adhesive layer 30 is formed by applying an adhesive to the surface of the sheath 13 at the end of the cable 10, and the adhesive layer 30 secures the cable boot 21 to the end of the cable 10.

Figure 3A:
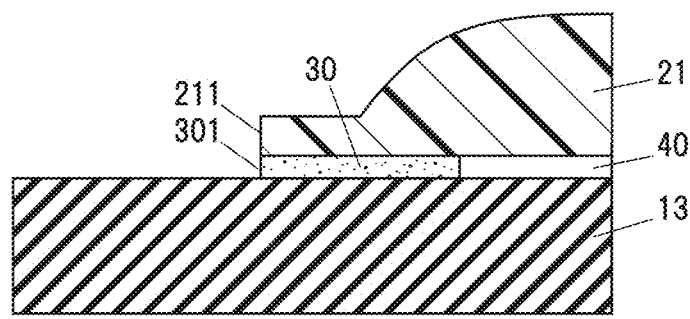
FIGS. 3A and 3B are enlarged cross-sectional views of the ultrasonic probe cable in the longitudinal direction, schematically showing the structure around the adhesive layer.
Figure 3B:
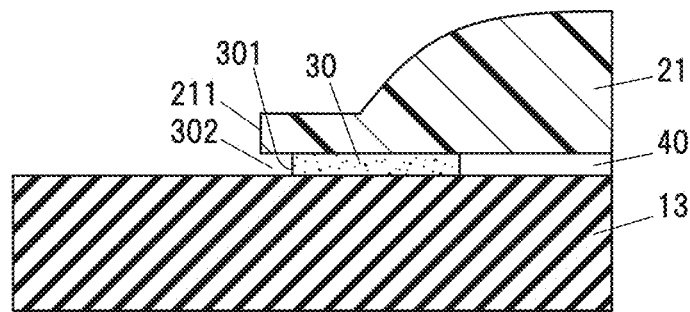

FIG. 3A is an enlarged cross-sectional view of the ultrasonic probe cable 1 in the longitudinal direction, schematically showing the structure around the adhesive layer 30. As shown in FIG. 3A, the adhesive layer 30 should be interposed between the cable boot 21 and the sheath 13 so that an end face 301 of the adhesive layer 30 is continuous with an end face 211 of the cable boot 21 without steps (i.e., without level differences). FIG. 3B shows an enlarged cross-sectional view of the ultrasonic probe cable 1 in the longitudinal direction when there is a step between the end face 301 of the adhesive layer 30 and the end face 211 of the cable boot 21 and a depression 302 is caused by this step. In this depression 302, bacteria and dirt may enter and accumulate, but when the end face 301 of the adhesive layer 30 and the end face 211 of the cable boot 21 are continuous without a step, no depression 302 is formed and bacteria and dirt can be effectively prevented from entering between the cable boot 21 and the sheath 13. To form the adhesive layer 30 in this manner, for example, the adhesive is applied over a moderate area on the surface of the sheath 13, then the cable boot 21 is inserted into the sheath 13, then the adhesive protruding from the cable boot 21 is wiped off, and then the adhesive remaining between the cable boot 21 and the sheath 13 is allowed to cure. The adhesive layer 30 may be formed protruding from the cable boot 21 if it does not create the depression 302 where bacteria or dirt can enter. In FIG. 3A, a space 40 is formed where no adhesive is applied, but the adhesive may be applied so that this space 40 is not formed.

The adhesive layer 30 has the end face 301 which is exposed, and at this exposed portion, it is directly irradiated by ultraviolet light. Therefore, it is preferable that the adhesive layer 30 have ultraviolet light resistance (UV resistance). Here, having ultraviolet light resistance shall be defined as satisfying at least one of the following three conditions: after exposure to UV light in the UV-C wavelength range (200-280 nm) at 1404 J/cm$^2$, no discoloration or bleeding in the adhesive layer 30, no spontaneous cracking (without applying external force) on the surface of the adhesive layer 30 and no overall fracture, and an elongation rate of 150% or higher for the adhesive layer 30.

The above condition of "150% or more" for the elongation rate of the adhesive layer 30 is set based on the minimum elongation rate of 150% which can withstand self-diameter bending (10 mm), assuming a cable with a sheath outer diameter of 10.0 mm and a sheath thickness of 0.80 mm as a general probe cable. Specifically, when a cable of the above size bends in its midline with no expansion or contraction, from the ratio of the "circumference length at the cable midline" to the "circumference length at the outer sheath midline" obtained from the radius of curvature with respect to the bend center ($[2\pi (10-0.8/2+10/2)/2\pi (10/2+10/2)] \times 100 \approx 146\%$), we determine that the minimum elongation rate which can be withstood in self-diameter bending (10 mm) is set at approximately 150%. Here, the self-diameter bending refers to bending in which the inner bend diameter of the bent cable is equal to the sheath outer diameter.

Since the adhesive layer 30 has ultraviolet light resistance, it can block ultraviolet light, thereby reducing degradation due to ultraviolet light irradiation of the parts of the sheath 13 and the cable boot 21 and other peripheral members that come in contact with the adhesive layer 30.

The adhesive layer 30 includes a base material made of a polymeric material and at least one of organic substance and an inorganic substance, which can shield against ultraviolet light in the UV-C wavelength range (200-280 nm) by absorption, scattering, or a combination thereof.

The polymeric material that is the base material for the adhesive layer 30 should have high flexibility, high adhesion, and chemical resistance. Here, having high flexibility shall mean, for example, that the elongation rate of the adhesive layer 30 meets the requirement of 150% or more. Also, having high adhesiveness shall mean, for example, that the tensile shear bond strength of the adhesive layer 30 satisfies the condition of 0.7 MPa or more. Here, the tensile shear bond strength is obtained by referring to the test method specified in the Japanese Industrial Standard "JIS K6850" "Tensile shear bond strength test method for rigid adherend materials". High chemical resistance shall mean that the adhesive layer 30 satisfies the above conditions of ultraviolet light resistance, high flexibility, and high adhesion after being in contact with a chemical solution, which is an acidic solution, alkaline solution, or organic solvent.

The additive material for the adhesive layer 30 includes, for example, at least one or more of aluminum oxide, cerium oxide, zinc oxide, indium oxide, zirconium oxide, tin oxide, manganese oxide, iron oxide, silicon oxide, titanium oxide, tungsten oxide, and carbon. In particular, it is preferable to use titanium oxide and carbon, which have excellent resistance to ultraviolet light in the UV-C wavelength range (200-280 nm) with a high bactericidal effect. Titanium oxide and carbon may be used in combination.

When the additive material for the adhesive layer 30 is titanium oxide, rutile type titanium oxide, anatase type titanium oxide, or brookite type titanium oxide may be used. That is, the additive material for the adhesive layer 30 is, for example, titanium oxide including at least one or more of rutile type titanium oxide, anatase type titanium oxide, or brookite type titanium oxide.

Since titanium oxides with different crystal structures have different absorption wavelengths, including multiple types of titanium oxides as the additive material can provide resistance to a wider range of UV light wavelengths. That is, when the additive material for the adhesive layer 30 is titanium oxide, it is preferable to include two or more of rutile type titanium oxide, anatase type titanium oxide, and brookite type titanium oxide.

The anatase type titanium oxide has a higher absorbance of UV light in the UV-C region (200-280 nm) than the rutile type titanium oxide. On the other hand, the rutile type titanium oxide can absorb longer wavelength UV light than the anatase type titanium oxide (rutile type titanium oxide can absorb ultraviolet light of about 400 nm or less, while anatase type titanium oxide can absorb ultraviolet light of about 370 nm or less).

Mixing rutile type titanium oxide and anatase type titanium oxide in a ratio of 70:30 to 90:10 increases the catalytic activity and improves the sterilization and disinfection effect of the adhesive layer 30 used to bond the sheath 13 and cable boot 21. When irradiating the ultrasonic probe cable 1 with ultraviolet light, the areas around the depression 302 in the sheath 13 and cable boot 21 should be careful not to be shaded by the ultraviolet light, but the disinfection/sterilization effect of the adhesive layer 30 can be obtained to reduce the risk more. For this reason, it is preferable to use titanium oxide including rutile and anatase titanium oxide in a ratio of 70:30 to 90:10 as the additive material for the adhesive layer 30.

In addition, tungsten oxide is normally yellow in color and turns blue when heated in a reducing atmosphere. Therefore, when tungsten oxide is used as the additive material for the adhesive layer 30, its unique color can be used as a marker.

The additive material for the adhesive layer 30 is added in a concentration that provides the UV resistance described above. For example, when titanium oxide is used as the additive material, 0.6 to 24 mass percent titanium oxide is added. The median diameter D50 of the additive material for the adhesive layer 30 is, e.g., 10 to 500 nm. The median diameter D50 is the median of the particle size distribution obtained in the particle size distribution measurement by laser light diffraction method.

The polymeric material that is the base material for the adhesive layer 30 can be, for example, a silicone-based resin, epoxy-based resin, or modified acrylic resin having high flexibility, high adhesion, and chemical resistance. In addition to these properties, it is more preferable to use a silicone-based resin as the base material for the adhesive layer 30, which has excellent heat and cold resistance, water resistance, fatigue property, and electrical property. In this case, either condensation-reaction type silicone resins or addition-reaction type silicone resins may be used. That is, the base material for the adhesive layer 30 is, for example, a silicone-based resin including at least one of condensation-reaction type silicone-based resin and addition-reaction type silicone-based resin. It is preferable to use a condensation-reaction silicone-based resin that cures at room temperature.

The sheath 13, which is the surface layer of the cable 10, comprises a resin composition including, for example, at least one or more of high-density polyethylene, low-density polyethylene, fluorinated resin, polyvinyl chloride, synthetic rubber, silicone resin, chloroprene rubber, and polyurethane. When the sheath 13 is made of a non-slidable material such as silicone-based resin, a coating film may be provided on the surface of the sheath 13 to improve its sliding property. In this case, the coating film of the sheath 13 becomes the surface layer of the cable 10.

Figure 4A:
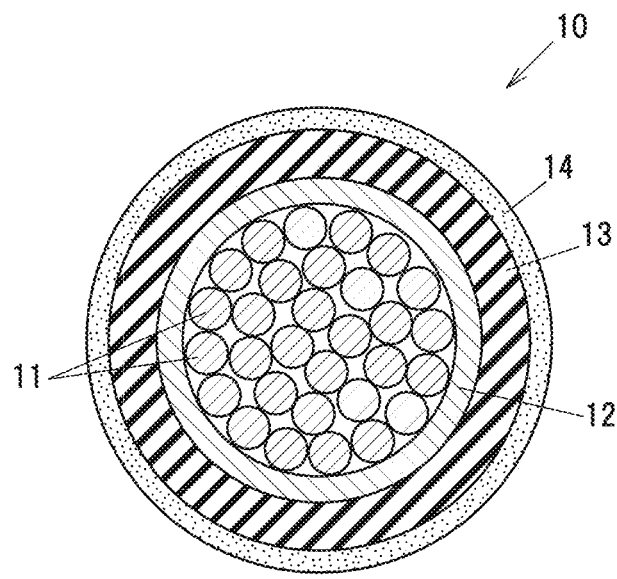
FIGS. 4A and 4B are cross-sectional views in the radial direction of the cable of the ultrasonic probe cable when the sheath has a coating film on the surface to improve sliding property.
Figure 4B:
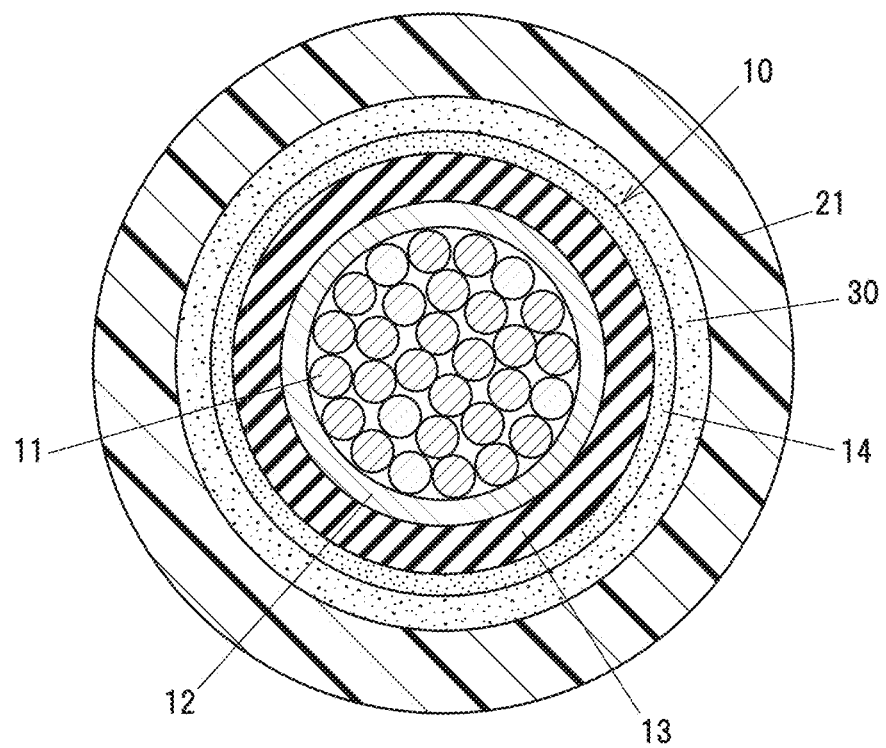

FIGS. 4A and 4B show cross-sections in the radial direction of the cable 10 of the ultrasonic probe cable 1 in the case where the sheath 13 has a coating film 14 on its surface for improving sliding property. The positions of the cross-sections in FIGS. 4A and 4B correspond to the positions of the cross-sections in FIGS. 2A and 2B, respectively. The coating film 14 is a coating film using a resin composition similar to the resin composition composing the sheath 13 as a base material and including fine particles such as silicone resin particles to improve sliding property by forming unevenness on the surface, for example, the sheath surface coating film disclosed in JP 2020-38824A can be used as the coating film 14.

The cable boot 21 is made of, e.g., silicone resin or polyvinyl chloride (PVC).

The sheath 13 of the cable 10 (and its coating film 14) and the cable boot 21 should contain an additive material capable of shielding against ultraviolet light as with the adhesive layer 30, and should be UV resistant.

When the sheath 13 of the cable 10 (and its coating film 14) and the cable boot 21 are made of silicone-based resin, it is preferable to use silicone-based resin as the base material for the adhesive layer 30. In this case, since the adhesive layer 30 has high elasticity and is made of the same type of silicone resin as the sheath 13 and cable boot 21, the adhesive strength during deformation between the sheath 13 (and its coating film 14) of the cable 10 and the cable boot 21 becomes high, and it is possible to effectively suppress detachment of the cable boot 21 from the cable 10 when stress due to bending, etc. is applied to the ultrasonic probe cable 1.

The adhesive layer 30 has ultraviolet light resistance because it includes an additive material capable of shielding against ultraviolet light. Therefore, even if the adhesive portion of the cable boot 21 and the cable 10 is exposed to ultraviolet light when the ultrasonic probe cable 1 is sterilized by irradiation of ultraviolet light, cracking due to low elasticity and hardening of the adhesive layer 30 can be suppressed. By suppressing cracking of the adhesive layer 30, it is possible to suppress damage and deterioration around the adhesive portion, such as peeling of the cable boot 21 from the cable 10 and penetration of bacteria, etc. (degradation of shielding performance) through cracks in the adhesive layer 30. In addition, the adhesive layer 30 shields against ultraviolet light, thereby suppressing degradation due to ultraviolet light of the portions of the cable 10 and the cable boot 21 in contact with the adhesive layer 30.

Figure 5A:
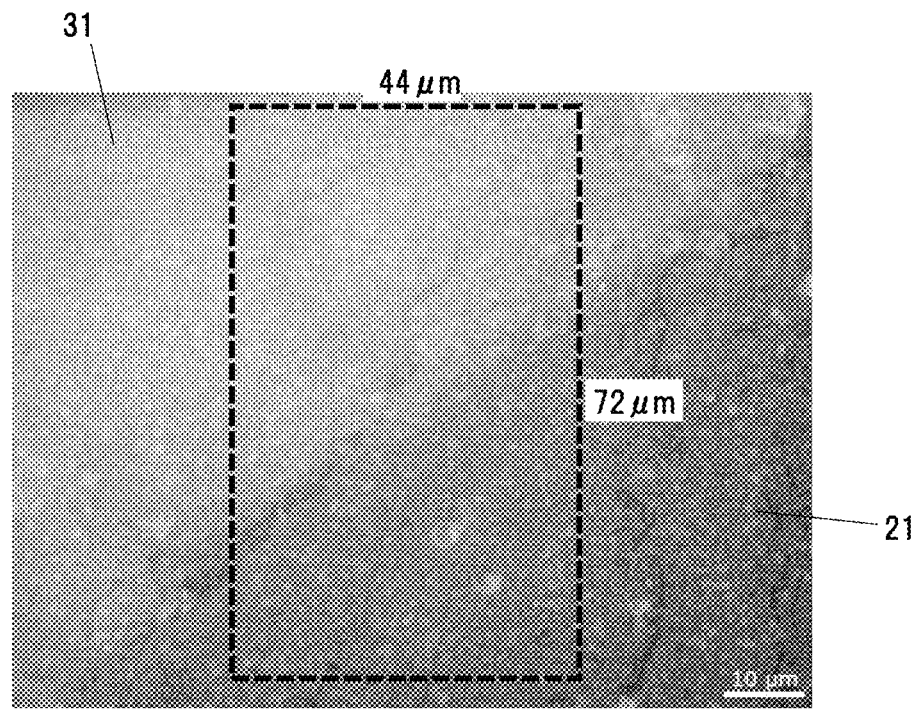
FIG. 5A is an optical microscope observation image of a cross-section near the end of the cable boot of the ultrasonic probe cable.

FIG. 5A is an observation image by optical microscopy of a cross-section near the end of the cable boot 21 of the ultrasonic probe cable 1. The observed image in FIG. 5A includes the cable boot 21 and the adhesive 31 on the surface of the cable boot 21, which has protruded from the adhesive layer 30 between the cable 10 and the cable boot 21 and ridden up to the surface of the cable boot 21. The adhesive 31 composing the adhesive layer 30 observed in FIG. 5A is made of silicone resin as a base material and includes 3 mass percent titanium oxide as an additive material that shields against ultraviolet light. The cable boot 21 is also made of silicone-based resin. The ultrasonic probe cable 1 observed in FIG. 5A is irradiated with irradiation energy of 2.66 mW/cm² UV light in the UV-C wavelength range for 90 seconds. The upper side of FIG. 5A is the surface side of the cable boot 21 and adhesive 31 (the side exposed to the UV light).

Figure 5B:
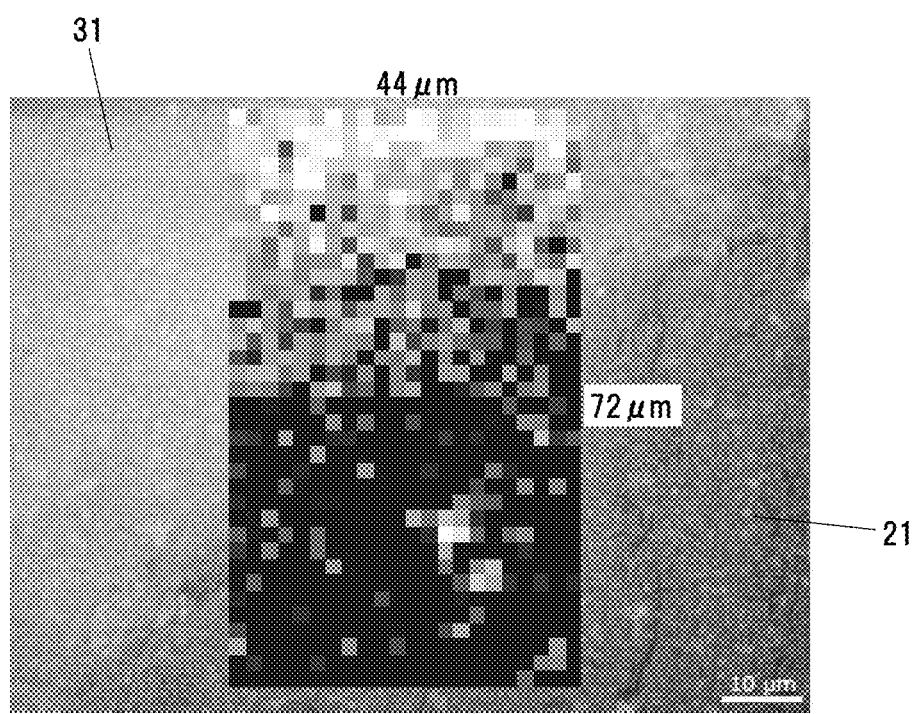
FIG. 5B is a mapping image of the distribution of the degree of degradation of the silicone resin overlaid on the observed image in FIG. 5A.

FIG. 5B shows a mapping image of the distribution of the degree of degradation of the silicone resin overlaid on the observed image of FIG. 5A. The distribution of the degree of degradation of the silicone resin in the mapping image of FIG. 5B is obtained from the intensity change of the peak at about 745 cm$^{-1}$ due to the C-C-O symmetric stretching vibration of silicone in the Raman spectrum obtained by the Raman scattering measurement. Regions with many bright dots in the mapping image are regions with a high degree of degradation (high peak intensity change), while regions with few bright dots (many dark dots) are regions with a low degree of degradation (low peak intensity change). The dotted line in FIG. 5A indicates the area where the mapping image in FIG. 5B is formed (the area where mapping is performed by Raman scattering measurement).

According to the mapping image in FIG. 5B, degradation of the silicone resin near the surface of the adhesive is observed, but inside the adhesive, degradation of the silicone resin is suppressed, and in the cable boot 21 below the adhesive, little degradation of the silicone resin is observed. This result confirms the UV light resistance of the adhesive composing the adhesive layer 30 and its effectiveness in shielding against UV light.

The boot-attached cable of the present invention is not limited to the ultrasonic probe cable 1, but may be a boot-attached cable having a cable, a cable boot, and an adhesive layer that bonds them, such as an endoscope with a camera at the tip of the cable.

The ultrasonic probe cable 1, which is a form of the boot-attached cable according to the present invention, is used in an ultrasonic image diagnostic device. The endoscope, which is another form of the boot-attached cable according to the invention, is used in an endoscope system. Therefore, according to the present invention, medical diagnostic devices such as ultrasonic image diagnostic devices and endoscope systems can be provided with cables with a boot, such as the ultrasonic probe cable 1 and endoscope scope.

EFFECTS OF THE EMBODIMENT

According to the above embodiment, it is possible to provide the boot-attached cable in which the cable boot is fixed to the cable by the adhesive layer, the boot-attached cable capable of suppressing damage and deterioration of the adhesive portion between the cable boot and the cable due to exposure to ultraviolet light, and to provide the medical diagnostic device equipped with the boot-attached cable.

SUMMARY OF THE EMBODIMENTS

Next, the technical concepts which can be grasped from the above-described embodiments will be described with the help of the reference characters, etc. in the embodiments. However, each reference character, etc. in the following description is not limited to the members, etc. specifically shown in the embodiment as the constituent elements in the scope of claims.

According to the feature [1], a boot-attached cable (1), comprises a cable (10); and a cable boot (21) secured to an end of the cable (10) by an adhesive layer (30), the adhesive layer (30) including an additive material comprising at least one of an organic substance and an inorganic substance, capable of shielding against ultraviolet light.

According to the feature [2], in the boot-attached cable (1) as described in the feature [1], the additive material includes at least one or more of aluminum oxide, cerium oxide, zinc oxide, indium oxide, zirconium oxide, tin oxide, manganese oxide, iron oxide, silicon oxide, titanium oxide, tungsten oxide, and carbon.

According to the feature [3], in the boot-attached cable (1) as described in the feature [2], the additive material is titanium oxide including, at least one or more of ruffle type titanium oxide, anatase type titanium oxide, and brookite type titanium oxide.

According to the feature [4], in the boot-attached cable (1) as described in any one of the features [1] to [3], the base material for the adhesive layer (30) is a silicone-based resin including at least one of condensation-reaction type silicone-based resin and addition-reaction type silicone-based resin.

According to the feature [5], in the boot-attached cable (1) as described in any one of the features [1] to [4], the surface layer of the cable (10) is made of a resin composition including at least one or more of high-density polyethylene, low-density polyethylene, fluorinated resin, polyvinyl chloride, synthetic rubber, silicone resin, chloroprene rubber, and polyurethane.

According to the feature [6], a medical diagnostic device includes the boot-attached cable (1) as described in any one of the features [1] to [5].

The invention is not limited to the above-described embodiments, but can be modified and implemented in various ways within the scope that does not depart from the main purpose of the invention. The embodiments described above are not limited to the inventions claimed in the claims. It should also be noted that not all of the combinations of the features described in the embodiments are essential to the means for solving the problems of the invention.

The invention claimed is:

1. A boot-attached cable, comprising:
    a cable; and
    a cable boot secured to an end of the cable by an adhesive layer,
    wherein the adhesive layer includes an additive material comprising at least one of an organic substance and an inorganic substance, capable of shielding against ultraviolet light, and
    wherein the adhesive layer is interposed between the cable boot and a sheath in such a manner that an end face of the adhesive layer is continuous with an end face of the cable boot without steps.

2. The boot-attached cable according to claim 1, wherein the additive material includes at least one or more of aluminum oxide, cerium oxide, zinc oxide, indium oxide, zirconium oxide, tin oxide, manganese oxide, iron oxide, silicon oxide, titanium oxide, tungsten oxide, and carbon.

3. The boot-attached cable according to claim 2, wherein the additive material is titanium oxide including at least one or more of rutile type titanium oxide, anatase type titanium oxide, and brookite type titanium oxide.

4. The boot-attached cable according to claim 1, wherein a base material for the adhesive layer is a silicone resin including at least one of condensation-reaction type silicone resin and addition-reaction type silicone resin.

5. The boot-attached cable according to claim 1, wherein the surface layer of the cable is made of a resin composition including at least one or more of high-density polyethylene, low-density polyethylene, fluorinated resin, polyvinyl chloride, synthetic rubber, silicone-based resin, chloroprene rubber, and polyurethane.

6. A medical diagnostic device, comprising: the boot-attached cable according to claim 1.

7. A boot-attached cable, comprising:
    a cable; and
    a cable boot secured to an end of the cable by an adhesive layer,
    wherein the adhesive layer includes an additive material comprising at least one of an organic substance and an inorganic substance, capable of shielding against ultraviolet light, and
    wherein the sheath and the cable boot each include an additive material capable of shielding against ultraviolet light, in addition to the adhesive layer.

8. The boot-attached cable according to claim 1, wherein the adhesive layer comprises a condensation-reaction type silicone resin that cures at room temperature.

9. The boot-attached cable according to claim 1,
    wherein the adhesive layer has a tensile shear bond strength of 0.7 MPa or more.

* * * * *